United States Patent
Yue

(10) Patent No.: US 8,067,713 B2
(45) Date of Patent: Nov. 29, 2011

(54) LASER CUTTING DEVICE WITH HIGH PRECISION

(75) Inventor: Guo-Han Yue, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 812 days.

(21) Appl. No.: 12/143,834

(22) Filed: Jun. 23, 2008

(65) Prior Publication Data
US 2009/0194514 A1 Aug. 6, 2009

(30) Foreign Application Priority Data
Feb. 1, 2008 (CN) .......................... 2008 1 0300312

(51) Int. Cl.
*B23K 26/14* (2006.01)
*B23K 26/36* (2006.01)
(52) U.S. Cl. .............................. 219/121.68; 219/121.84
(58) Field of Classification Search ............ 219/121.67–121.69, 121.72, 121.84
See application file for complete search history.

(56) References Cited

U.S. PATENT DOCUMENTS

| 4,303,824 A | * | 12/1981 | Morgan et al. | ........... 219/121.84 |
| 4,871,897 A | * | 10/1989 | Nielsen | ..................... 219/121.67 |
| 5,220,149 A | * | 6/1993 | Neidhardt | ................ 219/121.67 |
| 5,609,284 A | * | 3/1997 | Kondratenko | .................... 225/1 |

FOREIGN PATENT DOCUMENTS

| CN | 1308941 C | 4/2007 |
| TW | 200711776 A | 4/2007 |

* cited by examiner

*Primary Examiner* — Samuel M Heinrich
(74) *Attorney, Agent, or Firm* — Altis Law Group, Inc.

(57) ABSTRACT

An exemplary laser cutting device (300) includes a laser source (40), a lens module (51), a sprayer (60), a rotating subassembly (52), and a driving member (55). The lens module is configured for focusing a laser beam emitting from the laser source. The sprayer is rotatably connected to the lens module. The rotating subassembly is connected to the lens module. The rotating subassembly is configured for driving the lens module to rotate, such as to make the laser beam rotate relative to an axis of the laser beam. The driving member is connected to the lens and configured for driving the sprayer to rotate relative to the lens module.

17 Claims, 6 Drawing Sheets

LASER CUTTING DEVICE WITH HIGH PRECISION

BACKGROUND OF THE INVENTION

1. Field of the Invention

The present invention relates generally to laser cutting devices and, more particularly to a laser cutting device with high precision.

2. Discussion of the Related Art

Conventional methods for cutting glass sheets are based on the use of a diamond cutter or a small rotary cutter to first produce a scribed line in the glass sheet, and then break the glass sheet by application of an external mechanical force along the scribed line. The disadvantage of those methods is that the scribed line may cause fragments to be created from the surface, which can deposit on the glass and scratch it. In addition, chips can be created in the cut edge resulting in an uneven glass edge. Furthermore, micro-cracks produced on the cut edge during the scribing process lead to reduced mechanical stressability, increasing the risk of breakage. An approach for preventing the formation of fragments as well as chips and micro-cracks is to cut glass sheets using thermally induced mechanical tension. In this approach, a laser beam is directed at the glass and moved at a predetermined speed relative to the glass sheet, thereby producing such a high thermal tension that cracks form in the glass sheet. Then, the glass sheet is split into pieces mechanically.

Referring to FIG. 5, a typical laser cutting device 10 used for cutting a glass sheet 20 includes a laser source 11, a focusing lens 12, and a sprayer 13. The laser source 11 faces the focusing lens 12, and the sprayer 13 is fixed to the focusing lens 12. A laser beam emitting from the laser source 11 is focused by the focusing lens 12, and subsequently form an elliptic beam spot 111 on the glass sheet 20. In the process of cutting the glass sheet 20, the glass sheet 20 moves along the X-axis, thus keeping the major axis b of the elliptic beam spot 111 and a predetermined cutting line L1 aligned. Therefore, thermal energy of the elliptic beam spot 111 is symmetrically distributed along the predetermined cutting line L1. Then, the sprayer 13 ejects a coolant 131 onto the glass sheet 20 to cool the area heated by the elliptic beam spot 111, creating a crack 201 in the glass sheet 20 along the predetermined cutting line L1. The glass sheet 20 is split along the crack 201 by application of an external mechanical force on the glass sheet 20.

However, because the laser cutting device 10 is generally fixed to a machine tool (not shown), and the sprayer 13 is fixed to the focusing lens 12, if a predetermined cutting line L2 is curved, as shown in FIG. 6, the coolant 131 ejected by the sprayer 13 may deviate from the predetermined cutting line L2 since the coolant 131 is always aligned along the major axis b of the elliptic beam spot 111. Therefore, all portions along the predetermined cutting line L2 may not be equally cooled, leading to a reduction in cutting precision of the laser cutting device 10. Additionally, since the laser cutting device 10 is fixed to the machine tool, the major axis b of the elliptic beam spot 111 cannot be substantially aligned along a tangent T of the predetermined cutting line L2, thus leading to asymmetrical distribution of the thermal energy of the elliptic beam spot 111, and a further reduction in cutting precision.

Therefore, a laser cutting device to solve the aforementioned problems is desired.

SUMMARY

An exemplary laser cutting device includes a laser source, a lens, a sprayer, a rotating subassembly, and a driving member. The lens module is configured for focusing a laser beam emitting from the laser source. The sprayer is rotatably connected to the lens module. The rotating subassembly is connected to the lens module. The rotating subassembly is configured for driving the lens module to rotate, such as to make the laser beam rotate relative to an axis of the laser beam. The driving member is connected to the lens module and configured for driving the sprayer to rotate relative to the lens module.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present laser cutting device. Moreover, in the drawings, like reference numerals designate corresponding parts throughout the several views.

DETAILED DESCRIPTION OF THE EMBODIMENTS

Reference will now be made to the drawings to describe an exemplary embodiment of the present laser cutting device, in detail.

Figure 1:
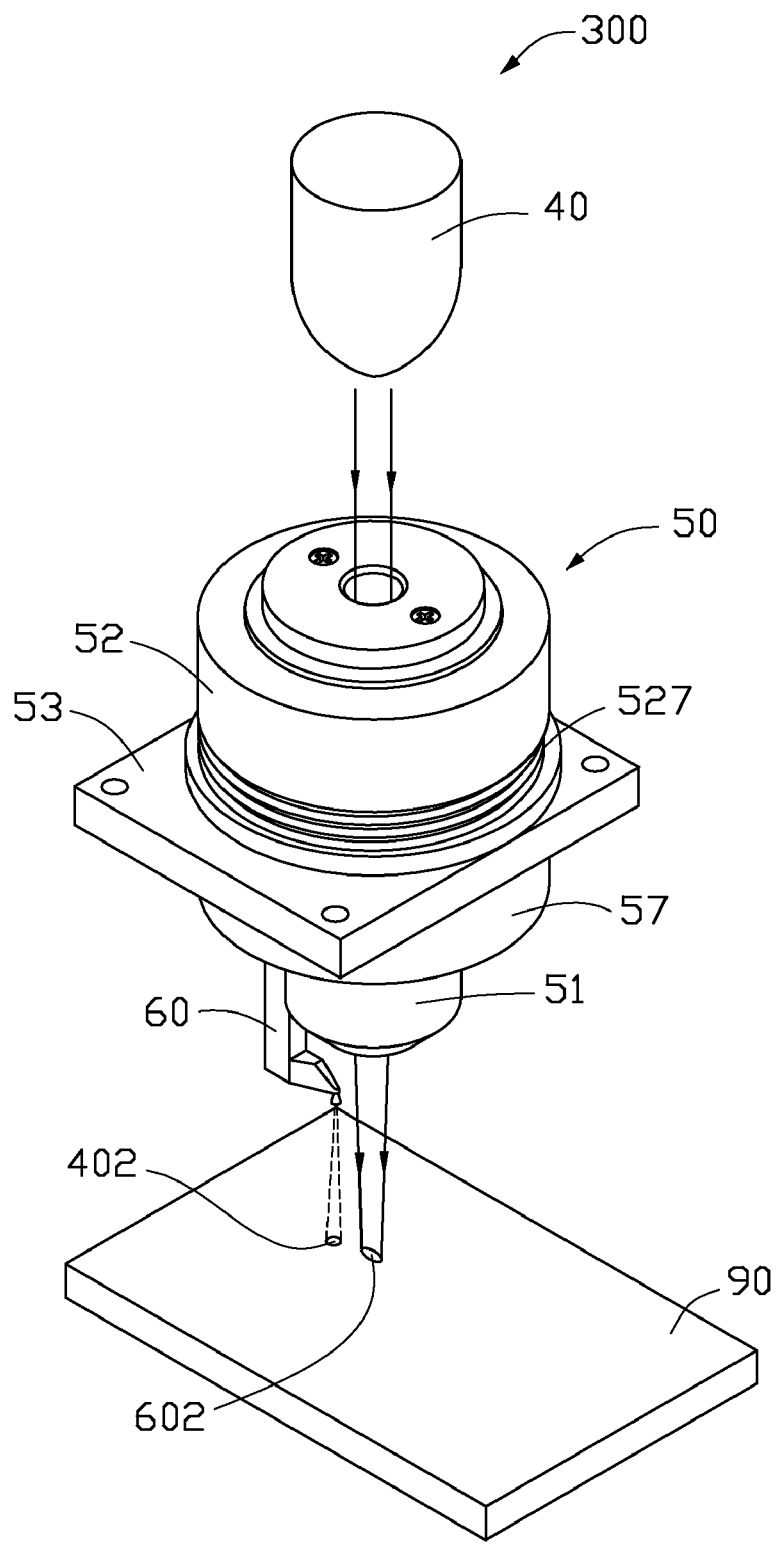
FIG. 1 is an assembled, isometric view of a laser cutting device cutting a glass sheet in accordance with a preferred embodiment of the present application.
Figure 2:
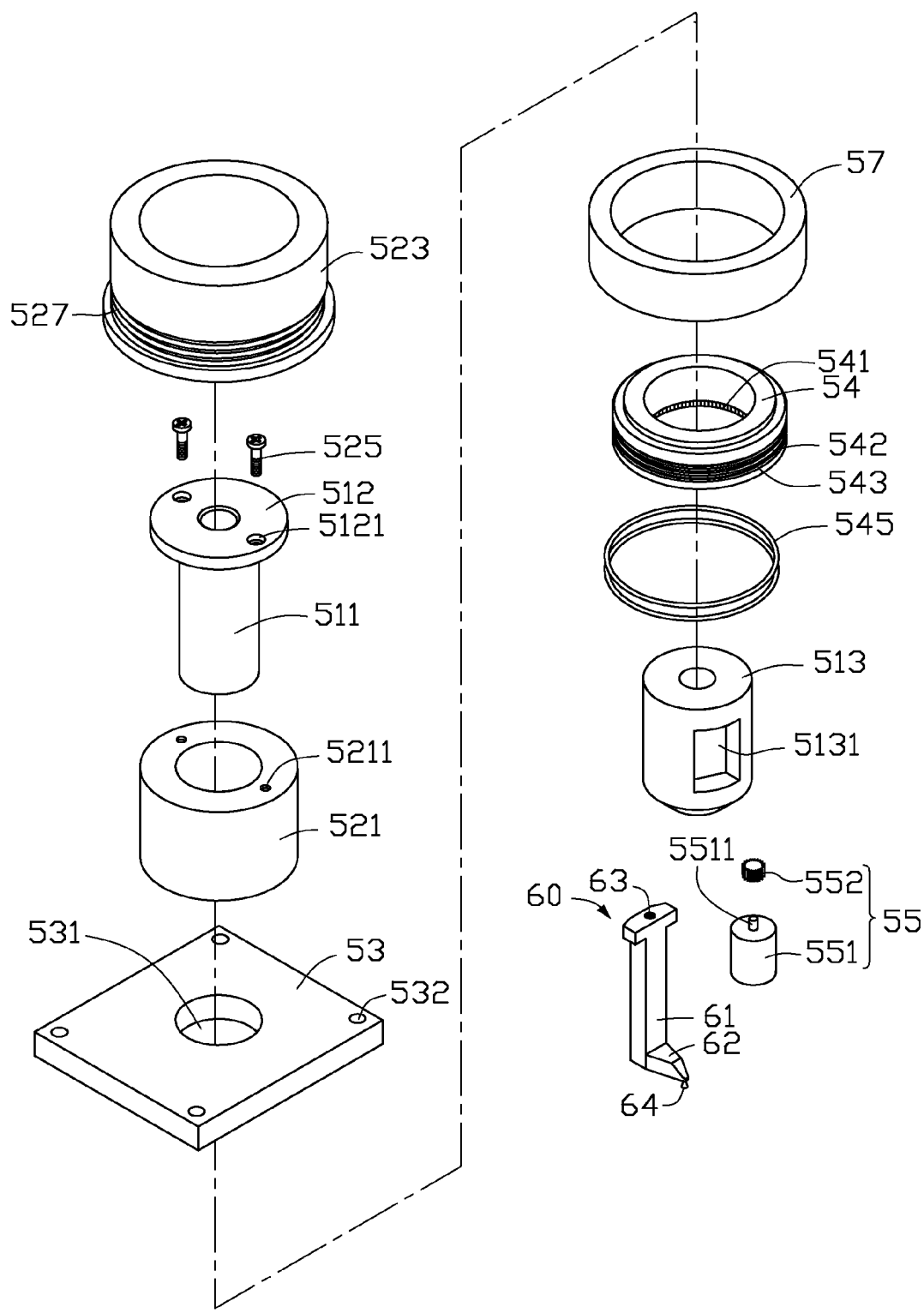
FIG. 2 is an exploded, isometric view of a focusing assembly of the laser cutting device of FIG. 1.
Figure 3:
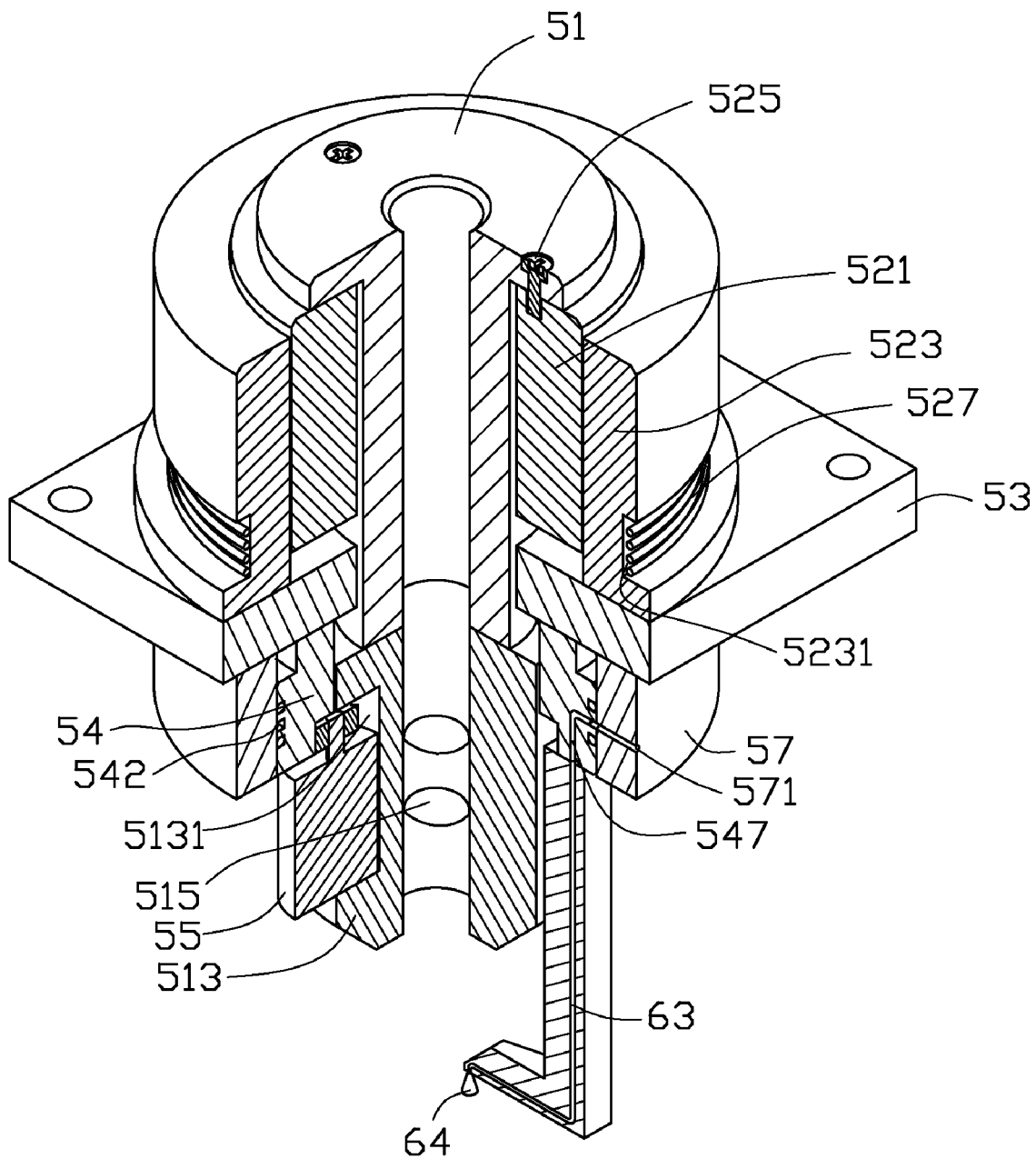
FIG. 3 is a cross-sectional, isometric view of the focusing assembly of FIG. 2.
Figure 4:
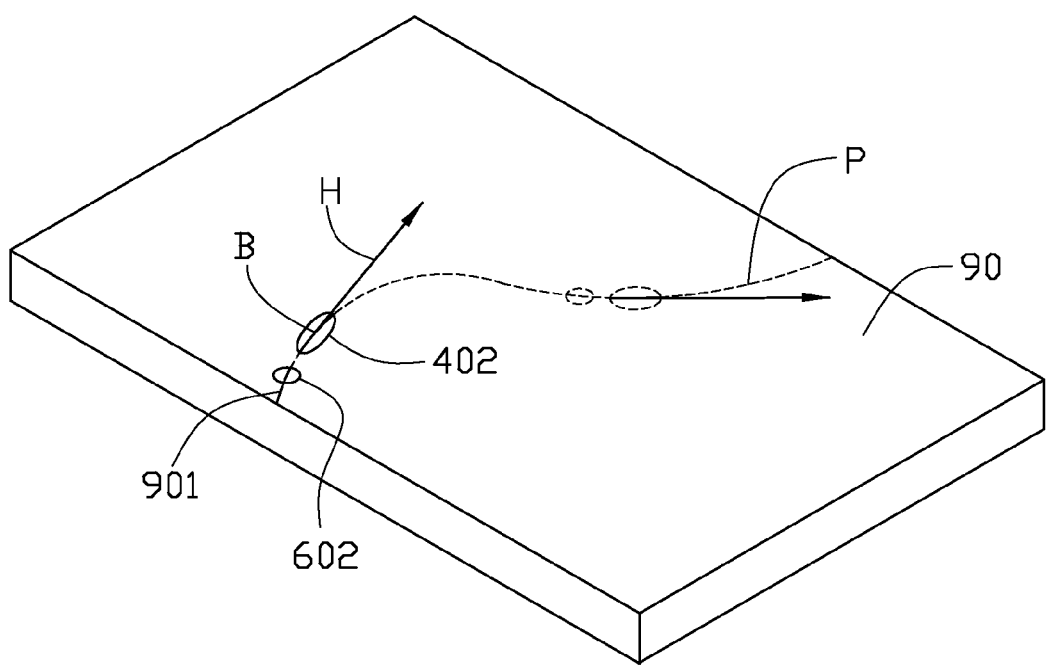
FIG. 4 is an isometric view of the glass sheet to be cut along a predetermined cutting curve by the laser cutting device of FIG. 1.
Figure 5:
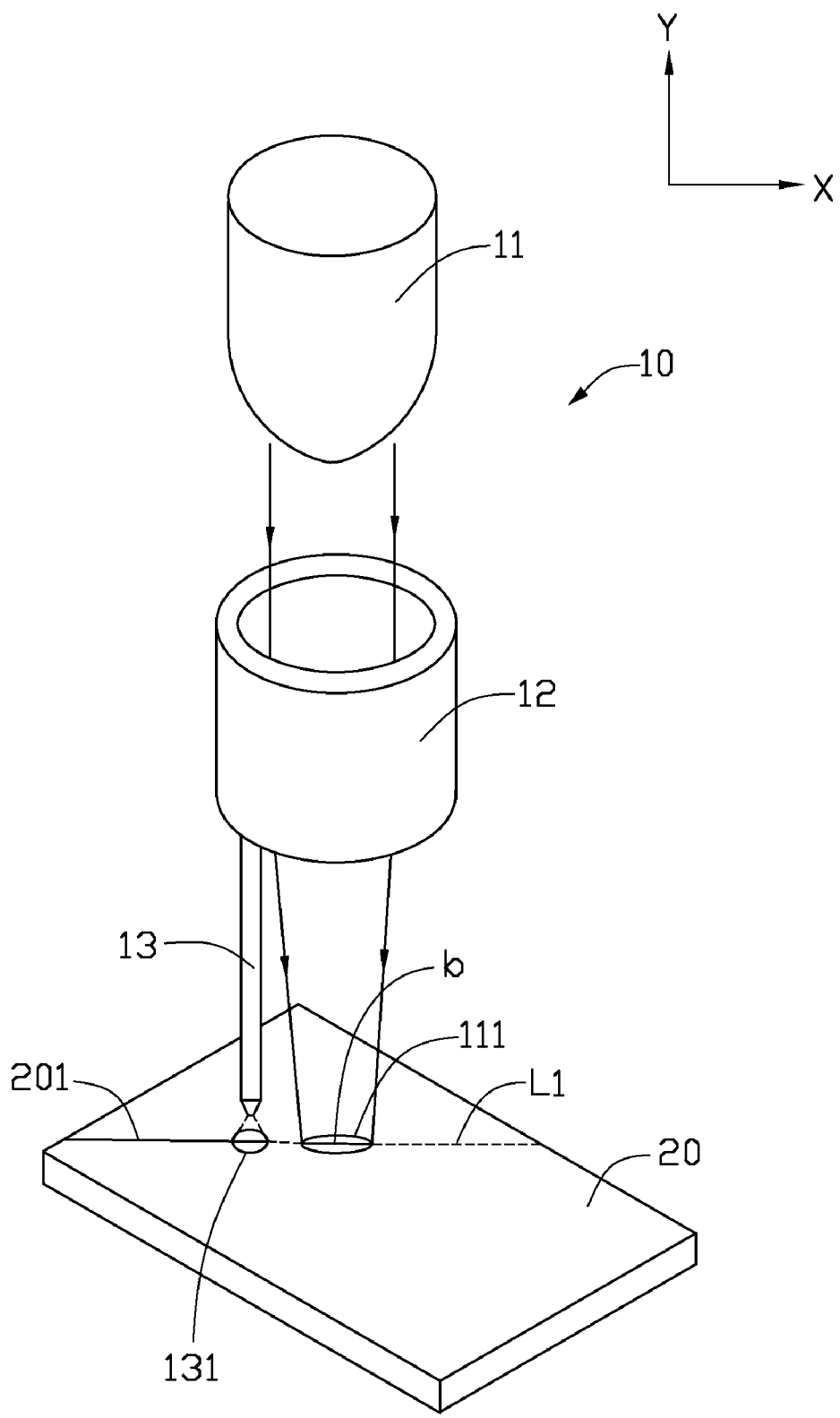
FIG. 5 is an isometric view of a conventional laser cutting device.
Figure 6:
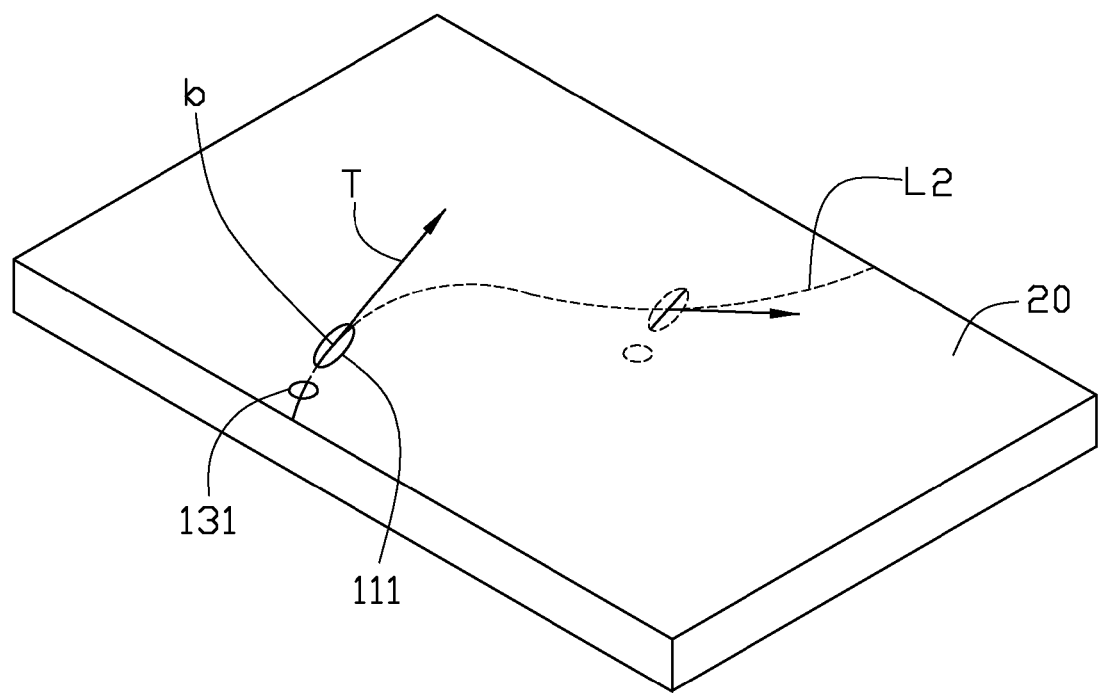
FIG. 6 is an isometric view of the glass sheet cut along a predetermined curved cutting line by the laser cutting device of FIG. 5.

Referring to FIGS. 1 through 3, a laser cutting device 300 used for cutting a glass sheet 90 includes a laser source 40, a focusing assembly 50, and a sprayer 60. The focusing assembly 50 is disposed between the laser source 40 and the glass sheet 90. The focusing assembly 50 includes a lens module 51, a rotating subassembly 52, a connecting plate 53, a lantern ring 54, a driving member 55, and a sleeve 57.

The lens module 51 includes a cylindrical barrel 511, a lens tube 513, and a focusing lens group 515. A flange 512 is formed around an end of the barrel 511. The flange 512 defines two through holes 5121. The lens tube 513 is fixed to the other end of the barrel 511 opposite to the flange 512, and a diameter of the lens tube 513 is larger than that of the barrel 511. A cylindrical surface of the lens tube 513 defines a depression 5131. The focusing lens group 515 is received in the lens tube 513.

The rotating subassembly 52 includes a rotor 521 and a stator 523. The rotor 521 is a hollow cylinder and is sleeved on the barrel 511 of the lens module 51. A top surface of the rotor 521 defines two assembling holes 5211 corresponding to the through holes 5121 of the flange 512. Two screws 525 extend through the through holes 5121 of the flange 512, and screw into the assembling holes 5211 correspondingly, thus fixing the rotor 521 to the lens module 51. The rotor 521 is made of conductive material, such as silicon steel. The stator 523 is sleeved on the rotor 521, and the rotor 521 is rotatable relative to the stator 523. The stator 523 defines an annular groove 5231 in the cylindrical surface. A coil 527 is received in the annular groove 5231 of the stator 523, and connected to the electrical source (not shown). When the coil 527 is provided with electric power by an electrical source, the rotor 521 can rotate relative to the stator 523 driven by an electromagnetic force created by the coil 527.

The connecting plate 53 is substantially a rectangular plate. The connecting plate 53 defines a positioning hole 531 in a center thereof for the barrel 511 of the lens module 51 to extend through. The connecting plate 53 also defines four through holes 532 in four corners respectively, for fixing the connecting plate 53 to a machine tool (not shown).

The lantern ring 54 is substantially a hollow cylinder, and rotatably sleeved on the lens tube 513. The lantern ring 54 includes an indented portion 541 formed at a bottom side of the inner surface, and defines two parallel annular grooves 543 and a receiving groove 542 in the cylindrical surface. The receiving groove 542 is between two annular grooves 543. Two O-rings 545 are received in the two annular grooves 543 correspondingly. The lantern ring 54 also defines a channel 547 therein, for communicating the receiving groove 542 of the lantern ring 54 with the sprayer 60.

The driving member 55 includes a motor 551 and a gear 552. The motor 551 includes a rotating axis 5511, and is configured for being fixedly received in the depression 5131 of the lens tube 513. The gear 552 is configured for disposing on the rotating axis 5511 and engaging with the indented portion 541 of the lantern ring 54, thereby driving the lantern ring 54 to rotate relative to the lens module 51.

The sleeve 57 is configured for receiving lantern ring 54. The sleeve 57 defines a through hole 571 for communicating with the receiving groove 542 of the lantern ring 54. The external coolant can flow into the through hole 571 via a pipe.

The sprayer 60 is fixed to a bottom surface of the lantern ring 54. The sprayer 60 defines a passage 63 therein. The passage 547 communicates the channel 547 of the lantern ring 54. A nozzle 64 is mounted an end of the sprayer 60 for spraying a coolant uniformly.

In assembly of the laser cutting device 300, the barrel 511 is inserted through the rotor 521 and the connecting plate 53, and is welded to the lens tube 513. The lantern ring 54 is sleeved on the lens tube 513. The motor 551 is received in the depression 5131 of the lens tube 513, and welded to the lens tube 513. The gear 552 is sleeved on the rotating axis 5511 of the motor 551, and engages with the indented portion 541. The O-rings 545 are received in the two annular grooves 543 of the lantern ring 54 respectively. The sleeve 57 is sleeved on the lantern ring 54, with the through hole 571 communicating the receiving groove 542 of the lantern ring 54. The stator 523 and the sleeve 57 are welded to the connecting plate 53. Then, the external coolant can pass the through hole 571 of the sleeve 57, the receiving groove 542 and the channel 547 of the lantern ring 54, the passage 63 of the sprayer 60, and finally sprayed out by the nozzle 64. The O-rings 545 received in the annular grooves 543 prevent the coolant from leaking out of the focusing assembly 50.

Referring to FIGS. 1 through 4, in a process of cutting the glass sheet 90 along a predetermined curved cutting path P, an original crack 901 is formed on a surface of the glass sheet 90 with a diamond cutter. The original crack 901 overlaps a threshold of the predetermined curved cutting path P. A laser beam from the laser source 40 is focused by the focusing lens group 515, to form an elliptic beam spot 402 on the glass sheet 90. The laser cutting device 300 moves corresponding to the predetermined curved cutting path P. Simultaneously, the coil 527 is provided with electric power for driving the rotor 521 to rotate, and the rotor 521 drive the lens module 51 to rotate. Therefore, a major axis B of the elliptic beam spot 402 is substantially aligned along a tangent H of the predetermined curved cutting path P where the elliptic beam spot 402 overlaps the cutting path P, when the elliptic beam spot 402 moves on the glass sheet 90. That is, thermal energy of the elliptic beam spot 402 is symmetrically distributed along the predetermined curved cutting path P during a cutting process. The lantern ring 54 is also driven to rotate by the lens module 51, thus making the sprayer 60 rotating relative to an axis of the lens module 51. At the same time, the motor 551 drives the gear 552 to rotate, thus driving the lantern ring 54 to further rotate relative to the lens module 51 in shuc a way that a coolant stream 602 sprayed out from the sprayer 60 follows the elliptic beam spot 402, along the predetermined curved cutting path P. A crack 901 is thus extended by the elliptic beam spot 402 and the coolant stream 602 along the predetermined curved cutting path P. Finally, the glass sheet 90 is split along the crack 901 by application of an external mechanical force on the glass sheet 90.

The rotating subassembly 52 can drive the lens module 51 together with the motor 551 to rotate, and the motor 551 can drive the lantern ring 54 further rotating relative to the lens module 51. Therefore, a rotating speed of the lantern ring 54 is different from that of the lens module 51. That is, the sprayer 60 fixed to the lantern ring 54 can rotate relative to the lens module 51, so as to make the coolant stream 602 substantially move along the predetermined curved cutting path P. In addition, the major axis B of the elliptic beam spot 402 is substantially aligned along a tangent H of the predetermined curved cutting path P, thereby leading to symmetrical distribution of the thermal energy of the elliptic beam spot 402 along the predetermined curved cutting path P. Therefore, the laser cutting device 300 has high cutting precision.

It should be pointed out that, the lens module 51 can also be driven to rotate by other rotating subassemblies, such as a rotating subassembly including a motor and a belt. The belt is sleeved on the lens module 51 and a rotating axis of the motor, thus driving the lens module 51 to rotate by action of the motor. Also, the belt can be replaced by a plurality of gears. In addition, the lens module 51 can be made of silicon steel, so as to omit the rotor 521. When the coil 527 is provided with electric power, the lens module 51 can be directly driven to rotate by electromagnetic force created by the coil 527. Furthermore, the laser cutting device 300 can cut other brittle nonmetallic materials, such as ceramic substrate.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A laser cutting device, comprising:
    a laser source;
    a lens module configured for focusing a laser beam emitting from the laser source;
    a sprayer rotatably connected to the lens;
    a rotating subassembly connected to the lens and configured for driving the lens to rotate, in order to make the laser beam rotate relative to an axis of the laser beam; and
    a driving member connected to the lens and configured for driving the sprayer to rotate relative to the lens, wherein the rotating subassembly comprises a stator and a rotor, the rotor is fixedly sleeved on the lens module and made of conductive materials, the stator is sleeved on the rotor, a coil is sleeved on the stator, and the rotor is driven to rotate when the coil is provided with electric power, such as to drive the lens module to rotate.

2. The laser cutting device as claimed in claim 1, wherein the laser cutting device further comprises a lantern ring rotatably sleeved on the lens module, the sprayer is fixed to the lantern ring.

3. The laser cutting device as claimed in claim 2, wherein the lantern ring forms an indented portion on an inner surface, the driving member comprises a motor and a gear, the motor has a rotating axis, the gear is sleeved on the rotating axis and engages with the indented portion of the lantern ring.

4. The laser cutting device as claimed in claim 3, wherein the lens module comprises a lens tube of hollow cylindrical shape for receiving the lenses therein, the lens tube defines a depression in the cylindrical surface, the motor is fixedly received in the depression.

5. The laser cutting device as claimed in claim 2, wherein the lantern ring defines two annular grooves in the cylindrical surface, the laser cutting device further comprises two O-rings, the O-rings are received in the annular grooves of the lantern ring correspondingly.

6. The laser cutting device as claimed in claim 5, wherein the lantern ring further defines a receiving groove between two annular grooves, and a channel therein for communicating the receiving groove of the lantern ring with the sprayer.

7. The laser cutting device as claimed in claim 6, further comprising a sleeve that sleeved on the lantern ring, the sleeve defining a through hole communicating with the receiving groove of the lantern ring.

8. The laser cutting device as claimed in claim 7, wherein the sprayer comprises a nozzle, the sprayer defines a passage communicating the channel of the lantern ring and the nozzle correspondingly.

9. The laser cutting device as claimed in claim 1, wherein the lens module comprises a lens tube and a focusing lens group, the focusing lens group is received in the lens tube, and the laser beam is formed as an elliptic beam spot on a workpiece.

10. The laser cutting device as claimed in claim 1, wherein the laser cutting device further comprise a connecting plate fixed to a structure, the connecting plate is sleeved on the lens module, and the stator is fixedly mounted on the connecting plate.

11. A laser cutting device comprising:
a laser source;
a focusing assembly having a lens module configured for focusing a laser beam emitting from the laser source, the lens module being rotatable relative to the laser source;
a sprayer rotatably connected to the lens module;
a driving member connected to the lens module and configured for driving the sprayer to rotate relative to the lens module; and
a lantern ring rotatably sleeved on the lens module, wherein the sprayer is fixed to the lantern ring, the lantern ring forms an indented portion on an inner surface, the driving member comprises a motor and a gear, the motor has a rotating axis, and the gear is sleeved on the rotating axis and engages with the indented portion of the lantern ring.

12. The laser cutting device as claimed in claim 11, wherein the lens module comprises a lens tube of hollow cylindrical shape for receiving the lenses therein, the lens tube defines a depression in the cylindrical surface, and the motor is fixedly received in the depression.

13. The laser cutting device as claimed in claim 11, wherein the lantern ring defines two annular grooves in the cylindrical surface, the laser cutting device further comprises two O-rings, the O-rings are received in the annular grooves of the lantern ring correspondingly.

14. The laser cutting device as claimed in claim 13, wherein the lantern ring further defines a receiving groove between two annular grooves, and a channel therein for communicating the receiving groove of the lantern ring with the sprayer.

15. The laser cutting device as claimed in claim 14, further comprising a sleeve that sleeved on the lantern ring, the sleeve defining a through hole communicating with the receiving groove of the lantern ring.

16. The laser cutting device as claimed in claim 11, wherein the lens module comprises a lens tube and a focusing lens group, the focusing lens group is received in the lens tube, and the laser beam is formed as an elliptic beam spot on a workpiece.

17. The laser cutting device as claimed in claim 11, wherein the laser cutting device further comprise a connecting plate fixed to a structure, the connecting plate is sleeved on the lens module, and the driving member is fixedly mounted on the connecting plate.

* * * * *